Oct. 26, 1926.

J. HARTZELL 1,604,823

METHOD AND APPARATUS FOR FLATTENING SHEET GLASS

Filed Oct. 17, 1924   2 Sheets-Sheet 1

INVENTOR
John Hartzell,

Patented Oct. 26, 1926.

1,604,823

UNITED STATES PATENT OFFICE.

JOHN HARTZELL, OF ARNOLD, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR FLATTENING SHEET GLASS.

Application filed October 17, 1924. Serial No. 744,154.

This invention relates to the flattening of sheet glass, such as window glass, and is herein shown as applied to the cylinder process of glass manufacture, although certain features of the invention are equally applicable to the sheet drawing process of glass making.

In the flattening of window glass, the glass to be flattened is generally supported upon a substantially continuous surface, which in the cylinder process takes the form of a flattening stone and in the sheet drawing process is the socalled chain table; and heat is applied above the glass to raise the same above the annealing temperature. The glass is then smoothed to a plane sheet either by rubbing or stretching, and is then permitted to cool while still supported by such surface until it reaches a temperature where it may be transferred to other supporting devices for cooling.

In the cylinder process, the flattening stones are generally mounted upon a horizontal wheel adapted for moving the stones to successive positions, and in the sheet drawing process the chain table is continuous, so that in either process any particular supporting surface will first support the glass as it is heated and flattened, and then as it cools; and will then be out of contact with the glass until the cycle has been completed and it is again available for supporting the unflattened glass. When high speeds are attained or when heavy glass is being flattened, it is found that the supporting surface frequently becomes almost as hot as the flattening chamber proper, and this causes burning of the glass with a marked reduction in quality.

I provide for circulating cooling fluid below the supporting surface during a part of its cycle of movement and thus maintaining it at a desired relatively low temperature. With my apparatus it is possible to attain high flattening speeds and still hold the flattening surfaces to such a low temperature that burning of the glass is practically eliminated.

The hot gases which are used for bringing the glass up to temperature are generally taken off in the path followed by the glass after it has been flattened, and since the gases are continually losing heat, they serve to permit a reduction in temperature of the glass but retard this cooling sufficiently to prevent distortion or cracking of the glass. In order to reduce the glass to the desired temperature at the proper time and also to materially aid in reducing the temperature of a supporting surface before it again comes in contact with the glass, I provide for withdrawing at least a portion of these hot gases before the end of the glass travel on the supporting surface.

In the drawings, showing my preferred form of apparatus as applied to the cylinder process of making window glass:

In the illustrated embodiment of the invention, there is shown a flattening oven having mounted therein a flattening wheel 2 carrying a plurality of flattening stones 3. These flattening stones are adapted to lie successively in the several positions shown in Figure 2 upon periodic rotation of the flattening wheel 2.

Figure 1:
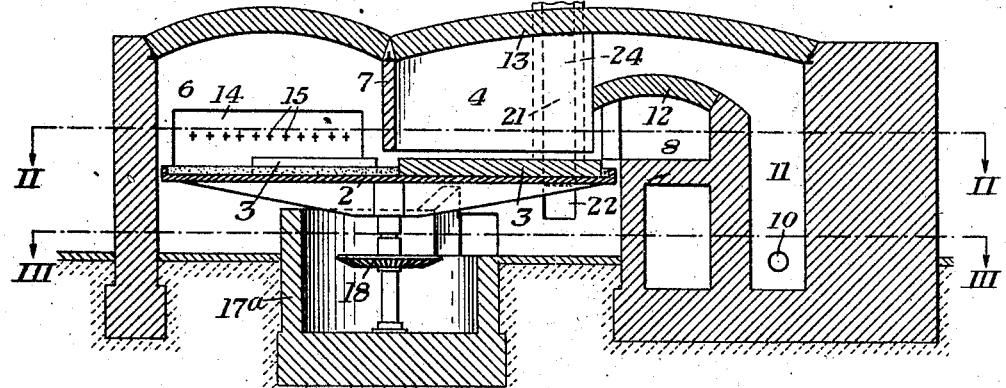
Figure 1 is a vertical section through a flattening oven embodying my invention and taken on the line I—I of Figure 2.
Figure 4:
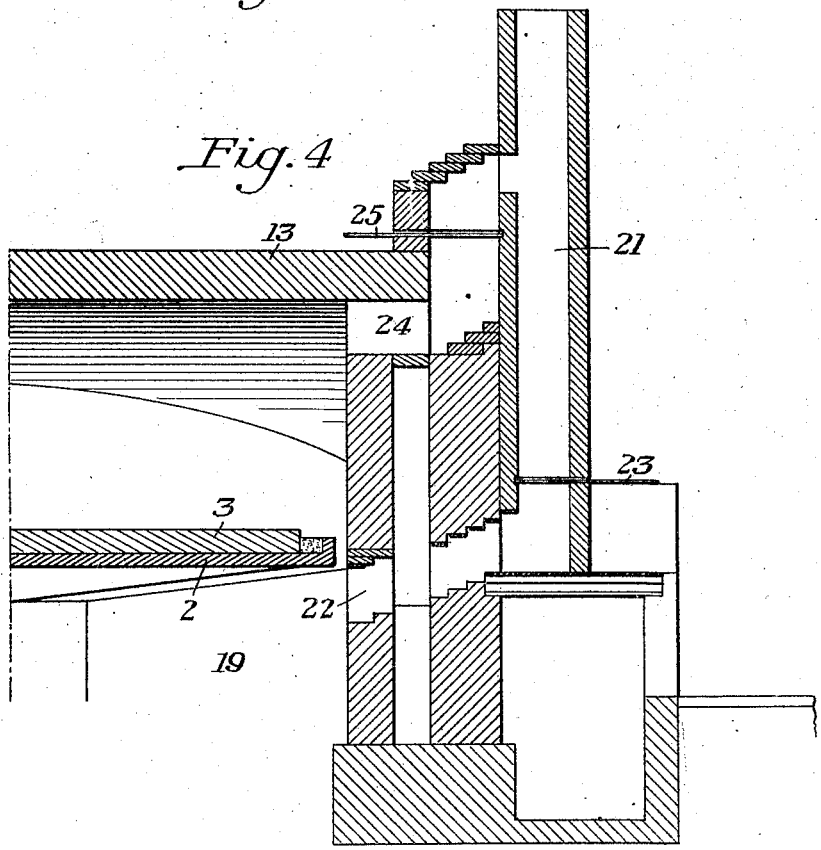
Figure 4 is a vertical section taken on the line IV—V of Figure 2.

The oven comprises the flattening oven proper, indicated by the reference character 4, the socalled "dummy" oven 5 and the cooling and piling oven 6. These various portions are separated by depending mantles 7 which extend to within a short distance from the top of the stones, as shown in Figure 1. Glass is supplied to this oven in the form of shawls through a stick-hole 8 and is partially heated therein. The flattener, working through an opening 9, picks up the shawl and lays it on that flattening stone 3 which is at the time in the flattening oven 4.

Heat is supplied to the oven by a suitable burner 10 in a burner pit 11 and sweeps up over the stick-hole arch 12 to the flattening oven 4. The heat is radiated from the oven arch 13 and quickly raises the glass to the desired flattening temperature. The operator then rubs the glass until it is flat and the wheel is rotated through an angle of 90° to bring the flattened sheet into the dummy oven 5.

The hot gases in the flattening oven escape therefrom partly through the stick-hole 8 and partly through the opening 9, but a material portion of these hot gases pass under the mantles 7 to the dummy oven and the cooling and piling oven. A large portion of the gases passing under the mantles is taken off through the leer tunnel 14.

Figure 2:
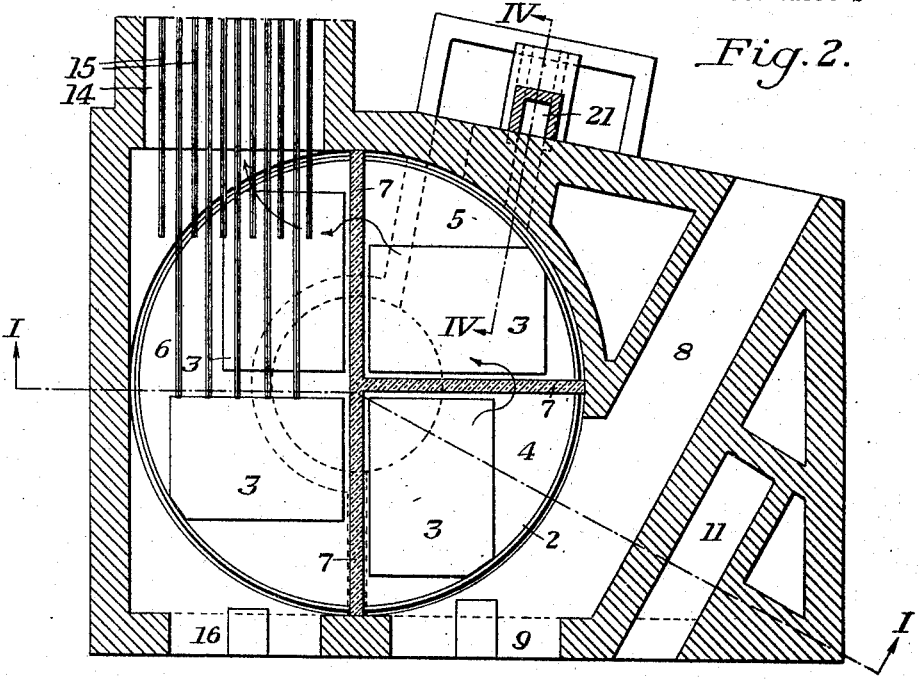
Figure 2 is a horizontal section through the flattening oven taken on the line II—II of Figure 1.

It will be seen from the above that a certain portion of the hot gases follow a substantially well defined path, as indicated by arrows in Figure 2, this path taking the gases out of the flattening oven 4 and under the mantle to the dummy oven 5, then from the dummy oven under the mantle to the cooling and piling oven 6 and then down the leer tunnel 14 to atmosphere.

While the first flattened sheet of glass is lying in the dummy oven, a succeeding shawl is flattened in the flattening oven 4 and the wheel is rotated another 90°, bringing a fresh stone into the flattening oven and rotating the first flattened sheet of glass into the cooling and piling oven. When the wheel is again rotated, the sheet is cool enough to be handled and is in position to be lifted on the leer rods 15, which is done by the flattener with a suitable fork through the opening 16. The next rotation of the wheel brings the flattening stone 3 which was originally in the flattening oven again in position to receive the unflattened sheet of glass and the cycle continues during the period of operation.

Figure 3:
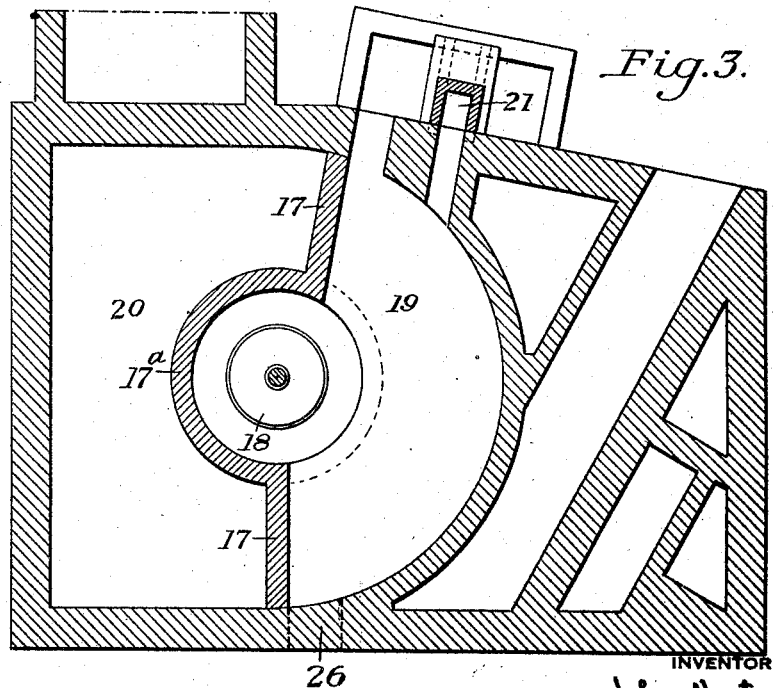
Figure 3 is a horizontal section taken on the line III—III of Figure 1.

It will be seen that if the hot gases play on the flattening stone over an extended period of time, as frequently occurs in operation, the stones will soon attain a temperature very close to that of the heating gases. When this condition occurs, the glass becomes too highly heated on the under side and is "burned" by the flattening surface. In order to prevent this, I provide a division wall 17 in the cellar of the oven below the wheel 2. This division wall extends from the front thereof toward the back in such manner as to divide that portion of the oven lying below the flattening oven proper and the dummy oven from that portion lying below the cooling and piling oven. As seen in Figure 3, this wall comprises radial portions 17 and a central cylindrical portion 17ª. The portion 17ª is provided in order to give clearance for the wheel structure and for the turning mechanism, which comprises a bevel gear 18 and connected driving mechanism therefor, not shown. The division wall is therefore effective for dividing the cellar into portions 19 and 20, the portion 19 lying below the flattening oven proper and the dummy oven, and the portion 20 lying below the cooling and piling oven. Obviously, since heat is applied to the stones principally in the flattening oven 4, it is desirable to supply the cooling fluid as provided by my invention in the portion 19. This is accomplished by providing a stack 21 having a passage 22 communicating with the space 19. A damper 23 is preferably provided for regulating the amount of cooling fluid which is circulated under the wheel. The cooling air enters the space 19 through the various crevices of the oven and also through the openings usually provided, such as the clean-out door 26. The circulation thus set up beneath the flattening wheel effectually reduces the temperature of the flattening stones and prevents burning of the glass.

In order to further cool the stones, I provide a passage 24 connecting the stack 21 with the dummy oven 5. This connection is effective for short-circuiting a material portion of the heating gases passing under the mantles 7 and thus reducing the soaking heat to which the stones are usually exposed in the dummy oven and the cooling and piling oven. In order to effectively regulate the apparatus, a damper 25 is preferably provided in the passage 24.

I thus provide an apparatus wherein the flattening may be accomplished at high speeds and without the burning of the product which has been heretofore experienced under certain working conditions. The apparatus may be readily adjusted to secure desired results, and it is found in operation to be exceedingly effective for the purposes set forth.

While I have illustrated a preferred embodiment of the invention as applied to the cylinder process of glass manufacture, it will be understood that my invention is not limited to such an embodiment but may be otherwise carried out within the scope of the following claims:

I claim:

1. Glass flattening apparatus, including a flattening oven, a flattening wheel therein having flattening surfaces adapted to be moved to successive positions by rotation of the wheel, means for supplying heat above one of such positions, means for passing cooling fluid below said position and a succeeding position, a partition between such positions, and means for withdrawing hot gases from above said succeeding position.

2. Glass flattening apparatus, including a flattening oven, a wheel therein having a plurality of flattening surfaces adapted to be moved to successive positions, and a division wall below the wheel separating the space below certain of said positions from the space below others.

3. Glass flattening apparatus, including a flattening oven, a wheel therein having a plurality of flattening surfaces adapted to be moved to successive positions, and a division wall below the wheel separating the space below certain of said positions from the space below others, the wall having a center portion adapted to accommodate a turning means for the wheel.

4. In the method of flattening glass, the steps consisting in supporting the glass to be flattened on successive supporting surfaces, applying heat above the glass, and passing cooling fluid under a plurality of such supporting surfaces successively.

5. In the method of flattening glass, the steps consisting in supporting the glass to be flattened on a plurality of successive supporting means, and supplying cooling fluid below the supporting means for only a portion of the time.

6. In the method of flattening glass, the steps consisting in supporting the glass to be flattened on a plurality of successive supporting elements, moving the supporting surfaces in an endless path, and passing cooling fluid below the supporting means during a portion only of their travel in said path.

7. In the method of flattening glass, the steps consisting in supporting and flattening the glass on successive supporting elements, moving the supports in an orbital path and specially cooling the supports during a portion only of their travel.

8. Apparatus for flattening glass comprising a flattening wheel and means for supplying cooling fluid thereto, said means being effective for supplying cooling fluid to a portion only of the wheel at one time.

9. Apparatus for flattening glass comprising a plurality of supporting elements adapted to move successively through a plurality of stations and means for applying cooling air to a portion only of the elements at any one time, said means being located adjacent a station and the supporting elements moving successively into cooperative relation with the cooling means.

10. Apparatus for flattening glass comprising a chamber, a flattening wheel within the chamber, a division wall extending into proximity with the wheel to form a smaller chamber adjacent which only a portion of the wheel may reside at any one time, and means for specially applying cooling fluid to such smaller chamber.

11. Apparatus for flattening glass comprising a chamber, a flattening wheel within the chamber, a division wall extending into proximity with the wheel to form a smaller chamber adjacent which only a portion of the wheel may reside at any one time, means for specially applying cooling fluid to such smaller chamber, and means for regulating the quantity of cooling fluid supplied.

In testimony whereof I have hereunto set my hand.

JOHN HARTZELL.